United States Patent
Gonzalez

(12) 
(10) Patent No.: US 6,820,940 B2
(45) Date of Patent: Nov. 23, 2004

(54) DUMP CART SUSTAINER

(76) Inventor: Edgar Gonzalez, 43 Trotters Cir., Kissimmee, FL (US) 34743

( * ) Notice: Subject to any disclaimer, the term of this patent is extended or adjusted under 35 U.S.C. 154(b) by 0 days.

(21) Appl. No.: 10/371,291

(22) Filed: Feb. 21, 2003

(65) Prior Publication Data

US 2003/0160499 A1 Aug. 28, 2003

Related U.S. Application Data

(60) Provisional application No. 60/360,031, filed on Feb. 22, 2002.

(51) Int. Cl.[7] .................................................. B60P 1/04
(52) U.S. Cl. ............................................. 298/2; 298/10
(58) Field of Search .......................... 298/2, 5, 10, 1 C, 298/7; 280/651, 659, 87.021, 47.26

(56) References Cited

U.S. PATENT DOCUMENTS

| | | | |
|---|---|---|---|
| 2,476,782 A | | 7/1949 | Tucker |
| 2,855,243 A | | 10/1958 | Jones |
| 2,895,238 A | * | 7/1959 | Long |
| 2,904,345 A | * | 9/1959 | Bradley |
| 2,952,434 A | * | 9/1960 | Blanchard |
| 3,000,671 A | * | 9/1961 | Monegato ...................... 298/2 |
| 3,658,383 A | | 4/1972 | Sisson ........................... 298/2 |
| 3,830,543 A | * | 8/1974 | Kostman ...................... 298/10 |
| 4,313,701 A | | 2/1982 | Brust ........................... 410/52 |
| 4,536,033 A | | 8/1985 | Allen ............................ 298/2 |
| 4,629,203 A | * | 12/1986 | Ballard |
| 4,632,461 A | | 12/1986 | Randolph ...................... 298/2 |
| 4,811,988 A | * | 3/1989 | Immel ........................... 298/2 |
| 4,861,110 A | * | 8/1989 | Rumpke ........................ 298/2 |
| RE33,131 E | * | 12/1989 | Morrison .................... 298/1 H |
| 6,193,319 B1 | | 2/2001 | Kielinski ...................... 298/2 |
| 6,659,565 B2 | * | 12/2003 | Brant ......................... 298/1 C |

FOREIGN PATENT DOCUMENTS

DK  105908  11/1966

* cited by examiner

Primary Examiner—Stephen Gordon
(74) Attorney, Agent, or Firm—William L. Muckelroy; Art Lessler; Gary Lipson

(57) ABSTRACT

A dump cart sustainer with a wheeled platform is provided for receiving, holding, transporting, and dumping a large heavy drum holding building materials such as concrete. The sustainer is structured to allow easy release, disposal, and replacement of the drum by receiving the drum in an apertured basket. The apertured basket avoids accumulation of any overflow from the drum and facilitates easy manual grappling and lifting by allowing hands and fingers to grasp the basket. The sustainer has a locking brake, drum clasping mechanism, and pivoting lifting post for the basket.

3 Claims, 2 Drawing Sheets

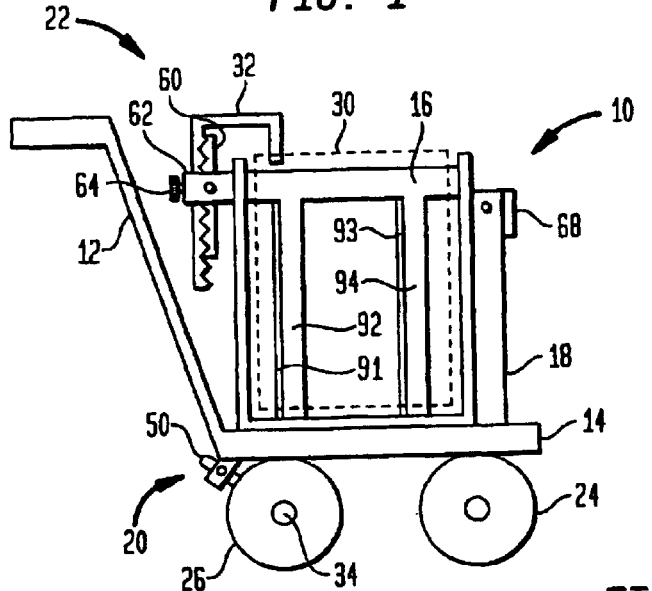
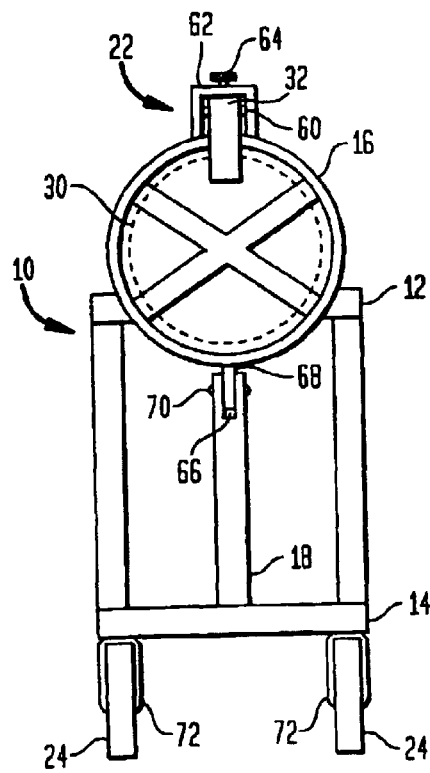
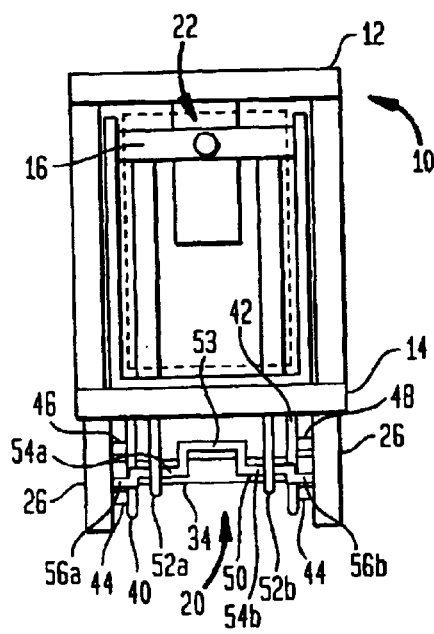

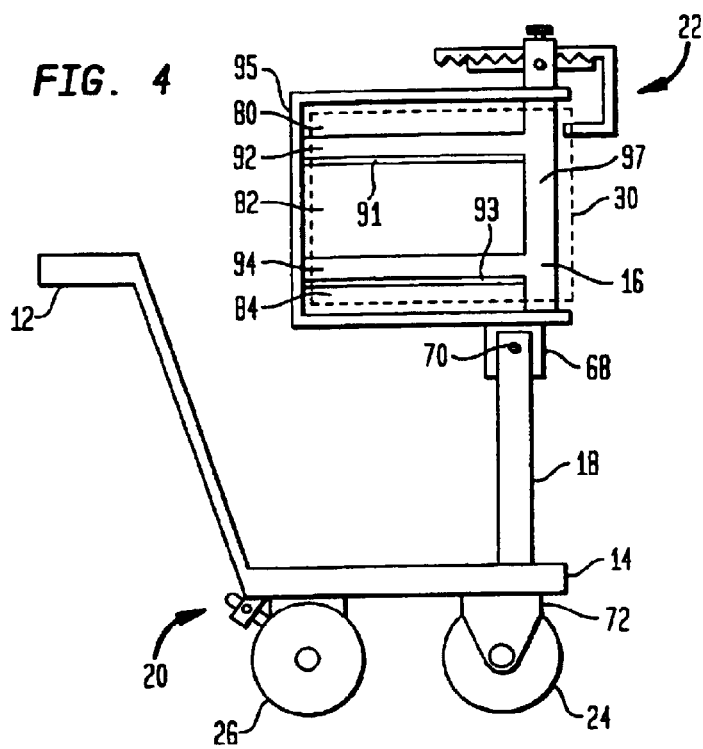
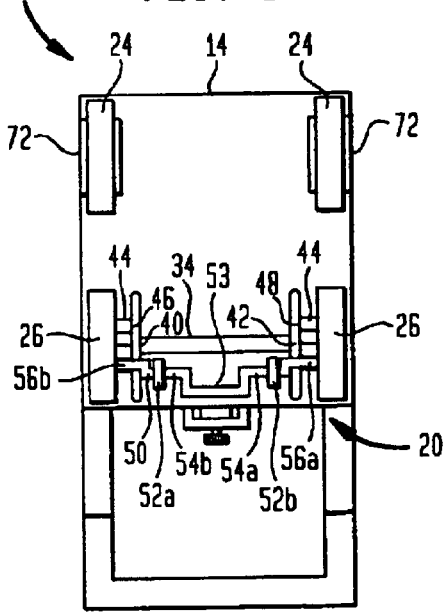
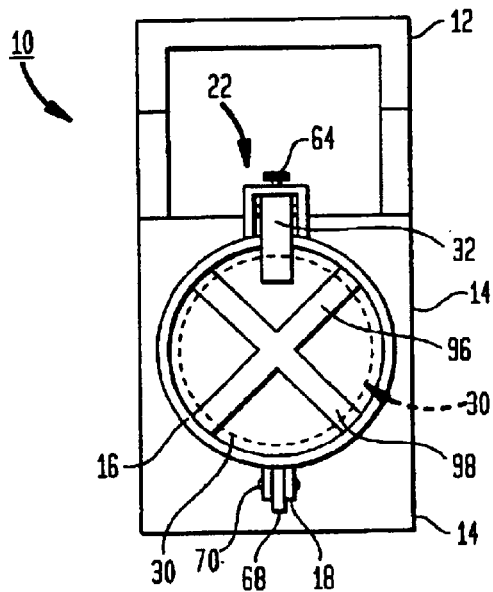

DUMP CART SUSTAINER

CROSS-REFERENCE TO RELATED APPLICATIONS AND PRIORITY CLAIM

The present application claims the benefit of a priority date based on applicant's co-pending U.S. Provisional Patent Application bearing Ser. No. 60/360,031, filed on Feb. 22, 2002.

BACKGROUND OF THE INVENTION

1. Field of the Invention

This invention relates to land vehicles, and more particularly to an improved, handle-propelled vehicle having laterally spaced wheels and a tiltable frame body adapted to receive and sustain a removable disposable receptacle in position during dumping.

2. Description of the Prior Art

Many different kinds of handle-propelled load carriers, known generally by terms such as "hand carts" or "barrows," have been proposed for use in carrying and dumping heavy loads such as soil, gravel, stones, fertilizers and other materials. One popular design is the conventional wheelbarrow, which comprises a load-carrying receptacle having a single, forwardly located wheel, a pair of feet located underneath a rear part of the receptacle, and a pair of handles extending to the rear. The conventional wheelbarrow has the advantage that its contents can be dumped by tilting the wheelbarrow forward or to either side. However, to propel the wheelbarrow, the operator needs to lift the handles to raise the wheelbarrow's feet off the ground, and hold the handles in the raised condition while walking forward. With very heavy loads, the wheelbarrow places a considerable strain on the operator, and unless great care is exercised, the wheelbarrow can tip over and/or the operator can sustain serious and debilitating lower back injury while propelling the wheelbarrow.

Modified wheelbarrows having two laterally spaced wheels have been proposed, but are subject to the same problems that are inherent in the conventional wheelbarrow. Moreover, the modified wheelbarrows have the drawback that if their contents adhere to the receptacle, the receptacle cannot be easily replaced or a full one substituted in its place.

To facilitate dumping of heavy loads such as mixed wet concrete or cement, for example, hand carts have been designed with receptacles that tilt relative to a frame, and with various mechanisms for facilitating the tilting motion. See, for example, U.S. Pat. No. 6,193,319 B1 issued to Kielinski on Feb. 27, 2001 for a handle-propelled, load-carrying tilting wheelbarrow and U.S. Pat. No. 4,313,701 issued to Brust on Feb. 2, 1982 for a removable container gimbals mounting on a transporting car container.

Hand carts with laterally spaced wheels have also been designed with the axle of the wheels located behind the center of gravity of the load so that, instead of lifting upward on the handle or handles to propel the cart, the operator pushes downward, thereby avoiding the back strain encountered in operating a conventional wheelbarrow. However, none have been designed with the view that one person operates the vehicle for locomotion and a separate person operates the dumping of the receptacle while the first person holds the vehicle.

Examples of some of the foregoing hand carts are depicted in the following U.S. patents.

| | |
|---|---|
| 2,770,491 | Perko |
| 2,852,304 | Harrison |
| 2,895,238 | Long |
| 3,160,439 | Kazakowitz |
| 3,888,501 | McChesney |
| 4,588,197 | Benedetto, Jr. |
| 4,629,203 | Ballard |
| 4,632,461 | Randolph |
| 4,789,171 | Porter |
| 4,861,110 | Rumpke |
| 5,149,116 | Donze et al. |

The prior art hand carts have all had limitations on the ease with which a load can be transported and dumped and on the re-usability of the receptacle where different types of pre-mixed concrete are ready and waiting in barrels for dumping at specified locations at a construction site. Even in the inventions of Long, Brust and Randolph, limitations resolved by this novel invention are encountered. Long, U.S. Pat. No. 2,895,238, describes a dump scoop having a load-receiving non-disposable, permanent body pivoted on a frame having a handle and rearwardly located wheels. Dumping is carried out by tilting the body on its pivot axis until a front edge of the body engages the ground, and then continuing to tilt the body forward, using a separate handle.

OBJECTS OF THE INVENTION

A principal object of this invention is to provide a novel dumping hand cart sustainer that has one or more of the following advantages: Operational safety with dumping performed by two persons, ability to handle and dump heavy loads of liquid mixed concrete and cement without difficulty and with a replaceable releasable substitutable receptacle.

Another object of the novel invention is to provide a dump cart sustainer for receiving a large heavy drum of liquids such as concrete, holding and locking the drum in place, manually transporting the drum in a basket of the sustainer to a work site, the basket being further adapted to hold the drum in place while tilting forward, horizontal, and downward whereby the contents of the drum are emptied while the drum is held on the sustainer.

SUMMARY OF THE INVENTION

The novel handle-propelled, load-carrying dumping cart sustainer comprises a tiltable steel basket frame adapted for receiving an open drum mounted on a movable cart platform. The platform has two front independently pivoting wheels and two rear wheels with braking sprockets, with the rear wheels being mounted on a common axle. The dump cart sustainer frame has a brake made of a rear wheel-engaging pedestal connected to a frame and extending downward therefrom at a location rearward of the axle; and the basket being pivotally connected to the platform by a post and pin structure, preferably adjacent to the front of the platform. The basket is pivotable forwardly and rearwardly about the pin from a hauling position, in which it extends rearwardly from the pin toward the rear of the platform to a dumping position in which it extends upward and forward of the front of the platform and post.

In a preferred embodiment of the invention, suitable for carrying heavy liquid cement and granular loads, such as sand, gravel, small rocks or the like, the basket receives a removable disposable container. The basket is an aperture with a partially opened bottom, and an opened side wall. A selectively engagable lock is included and essential to the utility of the invention and prevents release of the container from the basket.

The dump cart sustainer in accordance with the invention not only provides for easy transportation and dumping of granular loads, but is also adaptable to easily repeated reloading with different non-cross mixable loads by changing the disposable removable container.

Other objects, details and advantages of the invention will be apparent from the following detailed description when read in conjunction with the drawings.

BRIEF DESCRIPTION OF THE DRAWINGS

FIG. 1 is a side view of the novel dump cart sustainer;

FIG. 2 is a rear view of the novel dump cart sustainer;

FIG. 3 is a front view of the novel dump cart sustainer with its basket elevated in a horizontal position;

FIG. 4 is a left side view of the novel dump cart sustainer shown in FIG. 3;

FIG. 5 is a bottom view of the novel dump cart sustainer; and,

FIG. 6 is a top view of the novel dump cart sustainer.

DESCRIPTION OF THE PREFERRED EMBODIMENT

There is shown in FIG. 1 a novel dump cart sustainer 10 having a handle 12, a platform 14, a basket 16, a post 18, a brake 20, and a lock 22. The platform 14 has a transporting means for locomotion of the platform 14 comprising a steering means, for example, the handle 12 operating in conjunction with a pair of front wheels 24 and a pair of rear wheels 26. The platform 14 has a top and a bottom with the wheels attached to the bottom. The handle 12 is attached to the platform 14 and provides a first operator with a means for steering and holding the sustainer 10 while a second operator tilts and dumps a disposable container 30 (shown in dashed lines) resting in the basket 16.

The basket 16 has a locking means for retaining and locking the container 30 inside the basket 16. This locking means for retaining and locking the container 30 is comprised of the lock 22. The lock 22 has an adjusting means for adjustment of a clamp 32 to fit over the edge of the container 30 and grasp and clamp down on it.

Referring to FIG. 2, the brake 20 is comprised of an engaging means for engaging and locking the rear wheels 26. The wheels 26 are mounted on an axle 34 rotatably attached to the platform 14 via brackets 40 and 42. Each wheel 26 has a sprocket 44 affixed at its interior. A braking means for braking and holding the sustainer 10 in place comprises the slots 46 in the sprocket 44 attached to the left rear wheel 26 and slots 48 in another sprocket 44 attached to the right rear wheel 26. The slots 46 and 48 are each equally spaced between teeth in the sprockets 44.

A braking bar 50 is suspended underneath the platform 14 with each end thereof suspended in slidable engagement of the sprockets 44 by mounting brackets 52a and 52b.

The braking bar 50 is made of a cylindrical rod with a member 53 comprising a center elongated portion offset from and separating two integral coaxial portions 54a and 54b. Further offset from the portions 54a and 54b are two coaxial ends 56a and 56b adapted for engaging respective in-line slots 46 and 48 located around sprockets 44 attached to each rear wheel 26 and thereby locking the rear wheels 26.

The basket 16 is shown in FIG. 3 tilted to a horizontal position above the platform 14. The lock 22 is above and connected to the basket 16. The lock 22 holds and sustains the container 30, e.g. a drum, on the sustainer 10 as contents of the container 30 are dumped in front of the platform 14. The clamp 32 engages the edge of the container 30. The lock 22 attached to the basket 16 has a means for adjustment of the clamp 32 to the height of the rim of the container 30. The means for adjustment of the clamp 32 may be any of several constructions including a spring loaded lever mechanism such as that similar to a car jack or a screw mechanism such as that used in an adjustable wrench. However, the inventor has determined that the most reliable means for clamping down the rim of the container 30 in the basket 16 comprises a base plate 60 with a deep serrated surface matching a mating serrated surface on an inside face of the clamp 32 as shown in FIG. 1. The base plate 60 is affixed to a bracket 62 attached to the top of the basket 16. The clamp 32 has its serrated face disengageably pressed into the mated serrations of the plate 60 by means of a bolt 64 threadedly adjustably extended through the bracket 62 and pressing the clamp 32 against the plate 60. Thus, a position of the clamp 32 relative to the basket 16 and the rim of the container 30 is selected and adjusted.

The post 18 as shown in FIGS. 3, 4, and 6 has a groove 66 at its top adapted to rotatably receive a flange 68 attached to the basket 16. For example, the flange 68 pivots about a pin 70 for dumping the contents of the container 30 as the basket 16 is elevated, preferably by a second operator at the front of the sustainer 10. Further, the front wheels 24 employ caster mounts 72 attached to the platform 14 to provide maneuverability to the sustainer 10.

The brake 20, shown in detail in FIG. 5, is mounted on the bottom of the platform 14 by brackets 52a and 52b. The brackets 52a and 52b allow an operator to actuate and lock the wheels 26 with the brake 20 by depressing the member 53. The brake 20 is comprised of a braking bar 50 bent into the shape shown, and as further specified above, to rotate the ends 56a and 56b into in-line slots 46 and 48 located in the sprockets 44. As the member 53 is depressed, preferably by an operator's foot, the braking bar 50 rotates inside the conforming apertures of the brackets 52a and 52b and engages slots 46 and 48.

In FIG. 6 there is shown the basket 16, made of high strength steel, for example. The bottom of the basket 16 is apertured to allow drainage. Likewise, as shown in FIG. 4, the side of the basket 16 has apertures 80, 82, and 84 to provide a means for grappling and lifting the basket 16. The side further comprises integral ribs 91, 92, 93 and 94, which extend from a bottom rim 95 to a top rim 97 of the basket 16. The bottom rim 95 has a bottom comprised of at least two crossed integral members 96 and 98. The post 18 supports the basket 16 via the flange 68, which is integral to the basket 16. The flange 68 pivotally attached to the post 18 via the pin 70 is restrained from rotating or pivoting by a means for clamping down the basket 16 and the removable container 30, for example the lock 22.

A critical feature of the sustainer 10 to work properly is that its center of gravity always resides in the platform 14. Hence, the weight or mass of the platform 14 is at least three times that of the combined mass of the basket 16, post 18 and filled container 30. Thus, for a filled container 30 and basket weighing, for example, 150 kg., the combined weight of the platform and the support structures and wheels below it must weigh 450 kg. to 600 kg. This holds true for a wheel diameter ranging from 12.5 c. to 28 cm. with the bottom of the platform 14 about 17 cm. to 35 cm. above the support surface.

Many other mechanical versions as well as motorized conversions or modifications may be made to a selected component or component set of the novel apparatus described above and all are equivalents within the scope of the invention disclosed without departing from the scope of the invention as a whole as defined in the appended claims.

Parts List dump cart sustainer 10
handle 12
platform 14
basket 16
post 18
brake 20
lock 22
front wheel 24
rear wheel 26
container 30
clamp 32
axle 34
first rear bracket 40
second rear bracket 42
sprocket 44
slots 46 and 48
braking bar 50
mounting bracket 52*a*
mounting bracket 52*b*
member 53
coaxial portions 54*a* and 54*b*
coaxial ends 56*a* and 56*b*
base plate 60
bracket 62
bolt 64
groove 66
flange 68
pin 70
caster mount 72
brackets 52*a* and 52*b*
apertures 80, 82, and 84
integral ribs 91, 92, 93 and 94
bottom rim 95
top rim 97
crossed integral members 96 and 98

What is claimed is:

1. A handle-propelled, load-carrying wheeled dump cart sustainer comprising:

a frame having a front, a rear and left and right sides;

a rear axle connected to the frame adjacent to the rear thereof and extending laterally therefrom;

a first castered wheel connected to the frame adjacent the right front thereof;

a second castered wheel connected to the frame adjacent to the left front thereof;

two wheels mounted on the rear axle, the wheels being rotatable and positioned laterally inboard of the frame;

a cylindrical drum-engaging basket pivotingly connected to the frame at a location above the front of the frame;

the basket being apertured and pivotally connected to a post extending vertically from the front of the frame by a pin having an axis, substantially parallel to, and forward of, said axle, the basket being pivotable forwardly and rearwardly about said pin from a hauling position, in which said basket extends rearward from the pin toward and beyond the castered front wheels, to a dumping position in which said basket extends upward from the frame and over the post and pin;

a brake underneath the frame, engageable via sprockets with the rear axle;

a handle rigidly connected to the frame and extending upwardly and rearwardly therefrom;

the basket having a grabbing means for manually lifting the basket comprising apertures and ribs, the basket being movable upwardly to rotate about the pin so that the basket is lifted away from the frame and the frame can be moved on the wheels by manual operation of the handle;

the basket further comprising a load-receiving receptacle for a disposable replaceable container secured to the basket via a lock and tiltable forwardly with the basket when the basket is pivoted forwardly about said pin.

2. The dump cart sustainer of claim 1 wherein the brake comprises a pedal-like member for actuating the brake.

3. The dump cart sustainer of claim 1 wherein the brake comprises sprockets on the rear wheels engaged by a bar member.

* * * * *